(12) United States Patent
Morikawa et al.

(10) Patent No.: US 6,946,191 B2
(45) Date of Patent: Sep. 20, 2005

(54) MAGNETIC RECORDING MEDIUM

(75) Inventors: Takashi Morikawa, Tokyo (JP);
Teiichiro Umezawa, Tokyo (JP);
Hiroshi Tomiyasu, Tokyo (JP);
Masafumi Ishiyama, Singapore (SG)

(73) Assignees: Hoya Corporation, Tokyo (JP); Hoya Magnetics Singapore PTE, Tuas Link (SG)

(*) Notice: Subject to any disclaimer, the term of this patent is extended or adjusted under 35 U.S.C. 154(b) by 0 days.

(21) Appl. No.: 10/370,722

(22) Filed: Feb. 24, 2003

(65) Prior Publication Data

US 2003/0211363 A1 Nov. 13, 2003

(30) Foreign Application Priority Data

Feb. 25, 2002 (JP) .......................................... 2002-048421

(51) Int. Cl.[7] .................................................. G11B 5/72
(52) U.S. Cl. .................. 428/336; 428/408; 428/694 TC
(58) Field of Search .......................... 428/336, 694 TC, 428/408

(56) References Cited

U.S. PATENT DOCUMENTS

| 5,837,357 A | 11/1998 | Matsuo et al. | |
| 6,099,981 A | 8/2000 | Nishimori | |
| 6,136,403 A | * 10/2000 | Prabhakara et al. | ....... 428/65.3 |

FOREIGN PATENT DOCUMENTS

| JP | 11-175960 A | 7/1999 |
| JP | 3058066 | 4/2000 |

* cited by examiner

*Primary Examiner*—Stevan A. Resan
(74) *Attorney, Agent, or Firm*—Sughrue Mion, PLLC

(57) ABSTRACT

In a magnetic recording medium which comprises a substrate (1), a magnetic layer (3) formed on the substrate, a carbon-based protection layer (4) comprising carbon and formed on the magnetic layer, and a lubrication layer (5) formed on the carbon-based protection layer, the carbon-based protection layer comprises a hydrogenated carbon protection layer (4a) facing the magnetic layer and a nitrogenated carbon protection layer (4b) facing the lubrication layer. The hydrogenated carbon protection layer (4a) comprises carbon and hydrogen. The nitrogenated carbon protection layer (4b) includes no hydrogen but comprises carbon and nitrogen.

11 Claims, 1 Drawing Sheet

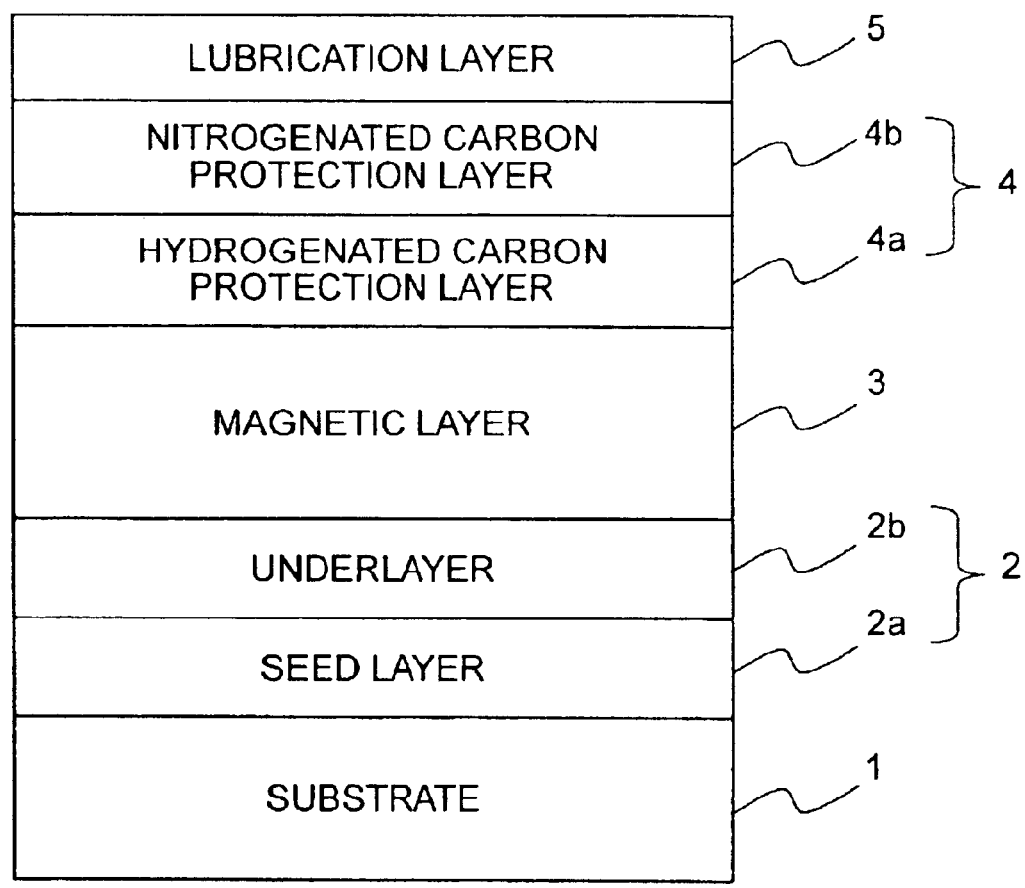

MAGNETIC RECORDING MEDIUM

BACKGROUND OF THE INVENTION

This invention relates to a magnetic recording medium for recording information and, in particular, to a magnetic disk to be mounted to a HDD (Hard Disk Drive) and the like.

In a conventional magnetic disk drive, use has been made of a CSS (Contact Start and Stop) system. In the CSS system, a magnetic recording head rests on a surface of a magnetic recording medium in contact with its inner-diameter area as a contact sliding zone when the rotation of the magnetic recording medium is stopped. During start-up, the magnetic recording head slides over the contact sliding zone in contact therewith to be slightly lifted up. When the magnetic recording head reaches a read/write zone located outside the contact sliding zone, a read or a write operation is started. In the above-mentioned CSS system, the contact sliding zone is required in addition to the read/write zone.

In the CSS system, the magnetic recording medium is provided with a roughened surface, called a textured surface, having a predetermined surface roughness in order to avoid adhesion between the magnetic recording medium and the magnetic recording head when the rotation of the magnetic recording medium is stopped.

In the CSS system, the magnetic recording medium must be protected from a damage resulting from contact sliding (or frictional sliding) of the magnetic recording head. To this end, the surface of the magnetic recording medium is coated with a carbon-based protection layer and a lubrication layer is applied onto the carbon-based protection layer as disclosed in Japanese patent No. 3058066.

On the other hand, use is recently made of a LUL (Load Unload) system allowing a remarkable increase in storage capacity. In the LUL system, the magnetic recording head rests on an inclined support, called a ramp, located outside the magnetic recording medium when the rotation of the magnetic recording medium is stopped. During start-up, the magnetic recording head slides from the ramp to an area above the surface of the magnetic recording medium after the rotation of the magnetic recording medium is started. Thus, in the LUL system, the magnetic recording head does not slide over the magnetic recording medium in contact therewith.

In the LUL system, it is unnecessary to provide the magnetic recording medium with the above-mentioned contact sliding zone required in the CSS system for the magnetic recording head to slide thereon. Therefore, the LUL system is advantageous in that the read/write zone of the magnetic recording medium is widened and the storage capacity of the magnetic recording medium is increased as compared with the CSS system.

In the LUL system, the magnetic recording medium and the magnetic recording head do not contact with each other. Therefore, the magnetic recording medium need not have the textured surface required in the CSS system and is improved in smoothness. As a consequence, it is possible to achieve a low flying height (15 nm or less) of the magnetic recording head as compared with the CSS system and to thereby improve the recording density of the magnetic recording medium.

With the transition from the CSS system to the LUL system, however, the magnetic recording head suffers corrosion of a read element portion thereof and frequent occurrence of fly stiction during operation at a flying position.

Upon occurrence of corrosion in the read element portion of the magnetic recording head, an output level of a readout signal is decreased. In this event, reading errors frequently occur and, sometimes, a reading operation is completely impossible. A corroded part may be enlarged to damage the magnetic recording medium while the magnetic recording head is operated at a flying position.

The fly stiction is a phenomenon that, while the magnetic recording head is operated at a flying position, its flying posture and/or its flying height is varied. This results in frequent occurrence of irregular variation in output level of the readout signal. Sometimes, the magnetic recording head at a flying positoin is brought into contact with the magnetic recording medium to cause crash so that the magnetic recording medium is broken. The fly stiction often occurs suddenly without any sign or precursory condition and is one of defects which are difficult to control.

As a result of research, the present inventors have clarified the factors causing frequent occurrence of the above-mentioned defects in the LUL system.

In recent years, the magnetic recording head uses a NPAB slider (Negative Pressure Air Bearing slider) easily controlled in flying height. In the magnetic recording head of the type, a negative pressure is produced on a slider surface during operation at a flying position. On the other hand, a very small amount of organic and inorganic substances are deposited in the read/write zone on the surface of the magnetic recording medium as deposited substances. Under the above-mentioned negative pressure, the magnetic recording head gradually collects, like a cleaner, the deposited substances and the lubrication layer comprising a highly flowable lubricant. The deposited substances thus collected are condensed and deposited on the slider surface as contaminants.

As a result of research by the present inventors, it has been found out that the CSS system has a cleaning function of cleaning these contaminants migrating from the magnetic recording medium to the magnetic recording head. Specifically, when the magnetic recording head slides over the contact sliding zone on the surface of the magnetic recording medium in contact therewith, the contaminants are removed and the magnetic recording head is cleaned via the contact with the surface of the magnetic recording medium. On the other hand, the above-mentioned cleaning function is not achieved in the LUL system because the magnetic recording head does not slide over the magnetic recording medium in contact therewith.

The inventors have found out that, in the LUL system without the cleaning function, the contaminants migrating to and condensed in the magnetic recording head, particularly, acidic contaminants such as sulfate contaminants, chloride contaminants, and nitride contaminants cause corrosion of the read element portion. In particular, a magnetoresistive read element (for example, MR, GMR, TMR elements) capable of obtaining a high output level is susceptible to corrosion.

Unlike a thin-film head which has traditionally been used, the magnetoresistive head has a read/write (R/W) separate structure in which a write element and a read element are separated. In case of the read/write separate structure, it is necessary to form a wide shield of, for example, Permalloy such as Fe—Ni, between the read and the read elements. Since Permalloy is an alloy susceptible to corrosion, the magnetoresistive head must strictly be protected from corrosion, unlike the thin-film head.

Since the above-mentioned cleaning function is not achieved in the LUL system, the lubricant forming the lubrication layer of the magnetic recording medium tends to migrate and be deposited on the magnetic recording head. The lubricant of the magnetic recording medium, thus migrating and deposited onto the magnetic recording head, tends to seriously disturb the flying posture of the magnetic recording head, resulting in occurrence of the fly stiction.

If the amount of those deposited substances or contaminants on the magnetic recording head reaches a predetermined level, the deposited substances will fall down onto the magnetic recording medium to cause crash while the magnetic recording head is operated at a flying position.

Furthermore, the improvement in smoothness of the surface of the magnetic recording medium following the transition into the LUL system further increases the mobility of a small amount of the organic and the inorganic substances deposited on the surface of the magnetic recording medium as well as the mobility of the highly flowable lubricant so that the above-mentioned migration is promoted. It has also been found out that the decrease in flying height of the magnetic recording head also promotes the above-mentioned migration.

From the above-mentioned reasons, a low flying height not greater than 15 nm can not stably be achieved in the LUL system unless the above-mentioned migration is suppressed.

SUMMARY OF THE INVENTION

It is an object of this invention to provide a magnetic recording medium capable of suppressing migration of contaminants remarkable in a disk drive operated in the LUL system and capable of suppressing adhesion and fly stiction of a magnetic recording head.

It is another object of this invention to provide a magnetic recording medium prevented from occurrence of fly stiction or other defects even if the flying height of a magnetic recording head is as small as 15 nm or less.

It is still another object of this invention to provide a technique of improving a production yield of a magnetic recording medium.

As a result of further research, the present inventors have revealed that inorganic and organic contaminants deposited on a magnetic recording medium and a less-bonded part of a lubrication layer are prevented from migrating to a magnetic recording head if surface activity of a carbon-based protection layer is increased in a boundary portion facing the lubrication layer by inclusion of nitrogen so that surface adsorption is increased.

Specifically, if nitrogen is contained in the carbon-based protection layer in the boundary portion facing the lubrication layer, C (carbon) and N (nitrogen) make triple bond in the boundary portion so that $N^+$ appears on an outermost surface facing the lubrication layer. $N^+$ makes electrical ionic bond with deposited substances on the surface of the magnetic recording medium, particularly, acidic contaminants such as sulfate contaminants (for example, $S^{2-}$ and $SO_4^{2-}$), chloride contaminants (for example, $Cl^-$), and nitride contaminants (for example, $NO_3^-$) to adsorb these substances. As a consequence, it is possible to suppress migration of the deposited substances on the surface of the magnetic recording medium to a magnetic recording head.

In the meanwhile, a lubricant forming the lubrication layer has, as a terminal group, a functional group having a negative polarity, for example, a hydroxyl group ($OH^-$) and a carboxyl group ($COOH^-$). These functional groups have high electrical affinity with $N^+$. Therefore, the bonding ratio between the carbon-based protection layer as a whole and the lubrication layer is improved so that the migration of the lubrication layer to the magnetic recording head is suppressed. Furthermore, because the terminal group of the lubricant and $N^+$ are high in electrical affinity with each other, coverage of the lubrication layer can be improved so that the deposition of the acidic contaminants and the like onto the surface of the magnetic recording medium can be suppressed.

However, it has been found out that, if hydrogen is contained in the carbon-based protection layer in the boundary portion facing the lubrication layer, the above-mentioned effect attained by inclusion of nitrogen does not substantially work.

Specifically, if hydrogen is contained in the carbon-based protection layer in the boundary portion facing the lubrication layer, C (carbon) and H (hydrogen) are bonded in the boundary portion so that a dangling bond (unbonded hand) of C is filled by H. The bond between C and H is electrically neutral. If a hydrogenated carbon film part in which carbon atoms are bonded with hydrogen atoms is present, even in a very small amount, in the carbon-based protection layer in the boundary portion facing the lubrication layer, the hydrogenated carbon film part and polar groups of the contaminants and the lubricant make no more than intermolecular force bond because the hydrogenated carbon film part is electrically neutral. The intermolecular force bond is weaker than the ionic bond. Therefore, if hydrogen is contained, even in a very small amount, in the carbon-based protection layer in the boundary portion facing the lubrication layer, the contaminants and the lubricant easily migrate to the magnetic recording head by a negative pressure induced by a negative pressure slider of the magnetic recording head.

In view of the above, the carbon-based protection layer preferably contain no hydrogen in the boundary portion facing the lubrication layer.

Herein, the technique disclosed in the above-referred Japanese patent No. 3058066 will be considered. The carbon-based protection layer in this technique has an outermost protection film comprising carbon, hydrogen, and nitrogen. In other words, the carbon-based protection layer has an outermost surface comprising a mixture of a carbon nitrogen layer, a hydrogenated carbon layer, and a hydrogenated nitrogenated carbon layer. Because of the above-mentioned reason, it is difficult with this structure to reliably prevent corrosion and fly stiction of a read element portion, particularly, a magnetoresistive read element, which are serious problems in the LUL system and at a low flying height of 15 nm or less associated therewith.

On the other hand, if the carbon-based protection layer contains hydrogen, the dangling bond of C is filled by H so that an amorphous structure high in rigidity and stable is formed. Therefore, the carbon-based protection layer as a whole exhibits high abrasion resistance. Therefore, the carbon-based protection layer preferably contains hydrogen in another boundary portion facing a magnetic layer. Specifically, the carbon nitrogen layer is soft and low in abrasion resistance as compared with the hydrogenated carbon layer. Therefore, if hydrogen is contained in the carbon-based protection layer in a base portion thereof, i.e., in the boundary portion facing the magnetic layer, a high rigidity of the carbon-based protection layer as a whole can be assured.

According to a first aspect of this invention, there is provided a magnetic recording medium comprising: a substrate; a magnetic layer formed on the substrate; a carbon-based protection layer comprising carbon and formed on the magnetic layer; and a lubrication layer formed on the carbon-based protection layer; the carbon-based protection layer comprising a rear boundary portion facing the magnetic layer and a front boundary portion facing the lubrication layer, the rear boundary portion comprising carbon and hydrogen, the front boundary portion including no hydrogen but comprising carbon and nitrogen.

In this invention, an intermediate portion of the carbon-based protection layer between the rear boundary portion facing the magnetic layer and the front boundary portion facing the lubrication layer may contain both of hydrogen and nitrogen. The concentration of hydrogen or nitrogen may be changed stepwise or continuously in a thickness direction of the carbon-based protection layer.

According to a second aspect of this invention, there is provided a magnetic recording medium according to the first aspect, wherein the carbon-based protection layer comprises a hydrogenated carbon protection layer facing the magnetic layer as the rear boundary portion and a nitrogenated carbon protection layer facing the lubrication layer as the front boudary portion, the hydrogenated carbon protection layer comprising carbon and hydrogen, the nitrogenated carbon protection layer including no hydrogen but comprising carbon and nitrogen.

Preferably, the hydrogenated carbon protection layer has a thickness not smaller than 20 angstroms. The thickness of the hydrogenated carbon protection layer being smaller than 20 angstroms is insufficient to maintain the rigidity of the carbon-based protection layer as a whole. During load and unload (LUL) operations, the magnetic recording head slides to and from an area above the magnetic recording medium. If the rigidity of the carbon-based protection layer is insufficient, the magnetic recording medium may be damaged or crashed due to mechanical shock produced during the above-mentioned operations. Thus, the thickness smaller than 20 angstroms is unfavorable. In order to reserve some margin sufficient to avoid the above-mentioned defect, the thickness of the hydrogenated carbon protection layer is preferably equal to 30 angstroms or more.

As regards the upper limit of the thickness of the hydrogenated carbon protection layer, no specific limitation is required as far as the LUL system is concerned. In this case, the upper limit is equal to a difference between the thickness of the carbon-based protection layer as a whole and the thickness of the nitrogenated carbon protection layer facing the lubrication layer.

In the meanwhile, following the transition from the CSS system to the LUL system, it is desired to reduce the flying height of the magnetic recording head and to reduce the thickness of the carbon-based protection layer so as to decrease magnetic spacing. As a consequence, metallic ions (Co or Pt) from the magnetic layer permeate through the carbon-based protection layer to leak out on the surface of the magnetic recording medium. This results in a phenomenon causing corrosion of the surface of the magnetic recording medium (medium corrosion), which is growing into a serious problem. Those leaking substances easily migrate to the magnetic recording head to cause crash or fly stiction.

In the LUL system, no cleaning function is achieved as mentioned above. Therefore, it is required to strictly prevent the medium corrosion. According to the research by the present inventors, it has been found out that the medium corrosion can effectively be prevented by exclusion of nitrogen in the hydrogenated carbon protection layer at a portion adjacent to the magnetic layer.

Specifically, as compared with a nitrogen-containing carbon layer such as the nitrogenated carbon protection layer and the hydrogenated nitrogenated carbon protection layer, the hydrogenated carbon protection layer has a dense structure and is capable of highly effectively preventing leakage of the metallic ions from the magnetic layer to the surface of the magnetic recording medium. Therefore, if a hydrogenated carbon film containing no nitrogen is disposed at the portion of the hydrogenated carbon protection layer adjacent to the magnetic layer, it is possible to sufficiently suppress the leakage of the metallic ions and to thereby improve the reliability of the LUL system.

The hydrogenated carbon protection layer preferably has a thickness not smaller than 5 angstroms. The thickness not smaller than 5 angstroms reliably suppresses the leakage of the metallic ions. More preferably, the hydrogenated carbon protection layer has a thickness not smaller than 10 angstroms. In this event, it is possible to more effectively suppress the leakage of the metallic ions and to further improve the reliability.

In view of suppressing the leakage of the metallic ions, it is unnecessary to define an upper limit for the thickness of the hydrogenated carbon protection layer.

The concentration of hydrogen contained in the hydrogenated carbon protection layer preferably falls within a range not smaller than 3 at % and smaller than 20 at % with respect to carbon.

If the concentration of hydrogen contained in the hydrogenated carbon protection layer is smaller than 3 at % with respect to carbon, it is impossible to achieve the rigidity sufficient to be resistant against the mechanical shock during the LUL operations and to sufficiently suppress the leakage of the metallic ions.

On the other hand, if the concentration of hydrogen contained in the hydrogenated carbon protection layer is not smaller than 20 at %, a polymeric carbon film part is increased so that the adhesion strength of the carbon-based protection layer as a whole to the magnetic layer is decreased. As a result, the protection layer or film is peeled off by the mechanical shock during the LUL operations.

More preferably, the concentration of hydrogen contained in the hydrogenated carbon protection layer falls within a range not smaller than 5 at % and not greater than 15 at % with respect to carbon. In this case, even if the carbon-based protection layer as a whole is formed into a thin film having a thickness of 70 angstroms or less, it is possible to increase the rigidity of the carbon-based protection layer as a whole and the adhesion strength to the magnetic layer.

In this invention, in the nitrogenated carbon protection layer, the content of nitrogen with respect to carbon is preferably not smaller than 4 at %. The content not smaller than 4 at % sufficiently suppresses the corrosion of the read element portion of the magnetic recording head.

In the magnetoresistive head capable of achieving a high reproduction output, the corrosion readily occurs as described above. However, if the content of nitrogen is 4 at % or more, it is possible to reliably suppress the corrosion of the magnetoresistive read element and the shield portion. It is also possible to suppress occurrence of the fly stiction. Thus, the content of nitrogen being 4 at % or more is suitable for a magnetic recording medium for use in the LUL system.

Preferably, in the nitrogenated carbon protection layer, the content of nitrogen with respect to carbon is not greater than 10 at %. The content of nitrogen exceeding 10 at % is unfavorable because an outermost surface of the nitrogenated carbon protection layer is neutralized. Specifically, if the content of nitrogen exceeds 10 at %, the amount of N filling the dangling bond of C is increased. As a consequence, the outermost surface of the nitrogenated carbon protection layer is gradually neutralized and the amount of $N^+$ on the outermost surface is reduced. According to the research by the present inventors, it has been found out that the outermost surface of the nitrogenated carbon protection layer is completely neutralized if the content of nitrogen reaches 10 at %.

If the amount of $N^+$ on the outermost surface of the nitrogenated carbon protection layer is reduced and neutralization proceeds, the magnetic recording medium is decreased in adsorption of contaminants. It is therefore possible to suppress deposition of the contaminants onto the surface of the magnetic recording medium. Thus, in case of the CSS system, no upper limit is required for the content of nitrogen. However, even if the outermost surface of the nitrogenated carbon protection layer is completely neutralized, the amount of the contaminants deposited onto the magnetic recording medium does never reach zero. Therefore, in the LUL system in which the cleaning function is not achieved, it is impossible to prevent migration and deposition onto the magnetic recording head having the negative pressure slider. Rather, it is effective to increase the adsorption of the contaminants by the magnetic recording medium within a controllable range, thereby preventing the contaminants deposited onto the magnetic recording medium from migrating to the magnetic recording head.

According to a third aspect of this invention, there is provided a magnetic recording medium according to the second aspect, wherein the nitrogenated carbon protection layer is formed so that the concentration of nitrogen with respect to carbon falls within a range not smaller than 4 at % and not greater than 10 at %.

In the nitrogenated carbon protection layer, the content of nitrogen is preferably not greater than 10 at % because $N^+$ can be present. Since the reduction of $N^+$ is started when the content of nitrogen exceeds 7 at %, the content of nitrogen is, more preferably, equal to 7 at % or less in order to fully exhibit the effect of this invention.

In the magnetic recording medium of this invention, the adsorption of the contaminants is improved as described above. Therefore, in case where the magnetic recording medium of this invention is mounted to a HDD (Hard Disk Drive), the environment inside the HDD is preferably kept at a level of Class 1000 or less.

Sometimes, a dynamic action may work between the nitrogenated carbon protection layer and the hydrogenated carbon protection layer because these layers are different in film stress, although it depends upon a production process. The dynamic action works directly if a definite boundary is present therebetween and indirectly through the intermediate portion in the thickness direction if no definite boundary is formed therebetween by the production process in which the contents of nitrogen and hydrogen are controllably varied continuously or stepwise in the thickness direction. As a result of the dynamic action working between the nitrogenated carbon protection layer and the hydrogenated carbon protection layer, the adhesion strength of the carbon-based protection layer as a whole may possibly be decreased. In particular, when the mechanical shock during the LUL operations is accumulated, the protection layer or film may be peeled off, in cooperation with the decrease in adhesion strength of the carbon-based protection layer as a whole.

In order to avoid the above-mentioned decrease in adhesion strength, the concentration of nitrogen in the nitrogenated carbon protection layer is lowered below the concentration of hydrogen in the hydrogenated carbon protection layer within the above-mentioned suitable ranges of contents of nitrogen and hydrogen. In this case, the difference in film stress therebetween is reduced so as to prevent the decrease in adhesion strength of the carbon-based protection layer as a whole.

In this invention, $N^+$ present on the surface of the nitrogenated carbon protection layer facing the lubrication layer increases the adsorption of the surface of the magnetic recording medium. Therefore, if the surface of the carbon-based protection layer is sufficiently covered with the nitrogenated carbon protection layer, the above-mentioned effect is exhibited.

However, if the thickness of the nitrogenated carbon protection layer is not greater than 1 angstrom, the coverage is insufficient and a part of the hydrogenated carbon protection layer facing the magnetic layer tends to be exposed.

If the thickness of the nitrogenated carbon protection layer is greater than 15 angstroms, the carbon-based protection layer as a whole is lowered in abrasion resistance because the nitrogenated carbon protection layer is low in rigidity. As a consequence, the surface of the magnetic recording medium is easily damaged due to the mechanical shock during the LUL operations. In view of the above, the thickness of the nitrogenated carbon protection layer is selected to be 15 angstroms or less so as to assure the reliability in the LUL system.

According to a fourth aspect of this invention, there is provided a magnetic recording medium according to the second or the third aspect, wherein the nitrogenated carbon protection layer has a thickness not smaller than 1 angstrom and not greater than 15 angstroms.

Herein, the thickness of the nitrogenated carbon protection layer may be equal to ¼ or less with respect to the carbon-based protection layer as a whole.

Preferably, the carbon-based protection layer as a whole has a thickness not greater than 70 angstroms. In the LUL system, the surface of the magnetic recording medium can be smoothed so that the flying height of the magnetic recording head can be lowered. If the carbon-based protection layer is formed as a thin film having a thickness of 70 angstroms or less, it is possible to reduce the magnetic spacing and to thereby improve the recording density.

If the thickness of the carbon-based protection layer as a whole exceeds 70 angstroms, the thickness of the hydrogenated carbon film facing the magnetic layer is consequently increased. However, since the hydrogenated carbon protection layer applies the stress to the magnetic layer, care must be taken if the thickness of the carbon-based protection layer exceeds 70 angstroms.

In this invention, a part of the carbon-based protection layer which faces the lubrication layer, i.e., the nitrogenated carbon protection layer may contain phosphorus (P). Inclusion of P is advantageous because $P^+$ is produced as $N^+$ is produced by N. In this case, the content of P is preferably selected so that the effect of nitrogen is not decreased.

In this invention, $N^+$ present on the surface of the nitrogenated carbon protection layer has the effect of improving the coverage and the bonding ratio of the lubrication layer. Preferably, the coverage is not smaller than 80%.

Thus, by increasing the coverage of the surface of the carbon-based protection layer (i.e., the surface of the nitrogenated carbon protection layer) by the lubrication layer, it is possible to reduce a contaminant adsorption site where a small amount of contaminants (for example, acidic contaminants) are deposited to the surface of the magnetic recording medium. Therefore, migration of the contaminants to the magnetic recording head is suppressed so that the above-mentioned corrosion can be suppressed.

According to a fifth aspect of this invention, there is provided a magnetic recording medium according to any one of the first through the fourth aspects, wherein the coverage by the lubrication layer is not smaller than 80%.

If the coverage of the surface of the carbon-based protection layer (i.e., the surface of the nitrogenated carbon protection layer) by the lubrication layer is not smaller than 80%, the contaminant adsorption site is reduced. However, following the improvement in coverage, the less-bonded part of the lubrication layer is relatively increased. Therefore, the bonding ratio must be equal to 70% or more.

The coverage by the lubrication layer being 85% or more is preferable because the contaminant adsorption site is substantially completely eliminated. The coverage of 85% or more is highly effective particular if the magnetoresistive head susceptible to corrosion is used.

In this invention, the bonding ratio of the lubrication layer is preferably not smaller than 70%.

If the bonding ratio of the lubrication layer is not smaller than 70%, the less-bonded part of the lubricant is reduced. It is therefore possible to suppress migration of the contaminants to the magnetic recording head. As a consequence, it is possible to suppress fly stiction or crash.

According to a sixth aspect of this invention, there is provided a magnetic recording medium according to any one of the first through the fifth aspects, wherein the bonding ratio of the lubrication layer is not smaller than 70%.

In this invention, no specific limitation is imposed upon the composition of the magnetic layer. However, by the use of a magnetic material containing Co or Pt easily permeating and leaking to the surface of the carbon-based protection layer, the effect of this invention is fully exhibited.

Specifically, the magnetic layer may comprise a CoPt-based alloy, a CoCr-based alloy, a CoCrPt-based alloy, a CoCrPtTa-based alloy, a CoCrPtTaB-based alloy, and a CoCrNi-based alloy.

In this invention, no specific limitation is imposed upon the material of the lubrication layer. However, it is preferable to use the material having a polar group adapted to form ionic bond with $N^+$ on the surface of the carbon-based protection layer. Preferably, the lubrication layer comprises a material containing a main chain of a fluorine-based lubricant PFPE (perfluoropolyether) and a functional group, such as a hydroxyl group ($OH^-$) or a carboxyl group ($COOH^-$), having a negative polarity.

More specifically, the lubrication layer may be formed by a lubricant "Fomblin Z-DOL" or "Fomblin Z-TETRAOL" manufactured by Ausimont. In particular, the lubrication layer containing Z-TETRAOL is greater in number of hydroxyl groups $OH^-$ than the lubrication layer containing Z-DOL. Therefore, the former has a high affinity in ionic bond with $N^+$ formed on the surface of the nitrogenated carbon protection layer so that the effect of this invention is remarkably exhibited.

Preferably, the lubrication layer has a thickness smaller than 18 angstroms, more preferably not greater than 15 angstroms.

If the thickness of the lubrication layer is not smaller than 18 angstroms, the less-bonded part between the lubrication layer and the carbon-based protection layer is increased because the lubrication layer is thick, even if the content of nitrogen in the nitrogenated carbon protection layer is controlled. In this case, it is difficult to achieve the bonding ratio of the lubrication layer as high as 70% or more so that fly stiction easily occurs in the LUL system.

The thickness of the lubrication layer is preferably not smaller than 5 angstroms.

If the thickness of the lubrication layer is smaller than 5 angstroms, it is difficult to achieve the coverage by the lubrication layer as high as 80% or more. In case where the magnetoresistive head is used, the corrosion readily occurs.

According to a seventh aspect of this invention, there is provided a magnetic recording medium according to any one of the first through the sixth aspects, wherein the magnetic recording medium has a principal surface having a surface roughness Ra of 0.7 nm or less.

If the surface roughness Ra of the principal surface of the magnetic recording medium is not greater than 0.7 nm, it is possible to reliably prevent the migration of the contaminants to the magnetic recording head, even if the flying height of the magnetic recording head as low as 15 nm or less is required in the LUL system.

In case of a flat surface having Ra not greater than 0.5 nm, the flowability of the lubrication layer is increased so that the bonding ratio of the lubrication layer is decreased. As a consequence, the migration of the lubrication layer to the magnetic recording head is promoted, resulting in easy occurrence of the fly stiction. Therefore, it is important to prevent the migration according to this invention as described above.

Preferably, the principal surface of the magnetic recording medium has a surface roughness Rq not greater than 0.9 nm. If Rq exceeds 0.9 nm, the difference in level between protruding and recessed parts of the surface profile of the magnetic recording medium is increased. As a consequence, the coverage by the lubrication layer is decreased.

If the surface roughness Rq of the principal surface of the magnetic recording medium is not greater than 0.7 nm, the coverage by the lubrication layer is easily increased to 80% or more.

Herein, the surface roughness such as Ra and Rq is defined in the Japanese Industrial Standard (JIS) B0601.

In this invention, the substrate is not particularly restricted. However, a glass substrate high in rigidity and adapted to ever-increasing recording density is preferable. The glass substrate includes a chemically strengthened amorphous glass substrate and a crystallized glass substrate. In particular, a substrate obtained by chemically strengthening an aluminosilicate glass which can easily be smoothed is preferable in this invention because of high rigidity and high smoothness.

In order to produce the magnetic recording medium of this invention, use may be made of sputtering (DC magnetron sputtering, RF sputtering, or the like), plasma CVD, or ion beam deposition.

In particular, the carbon-based protection layer can be obtained by forming the hydrogenated carbon protection film in a mixed gas atmosphere containing an inactive gas such as Ar (argon) and a hydrogen-containing gas and thereafter forming the nitrogenated carbon protection film containing no hydrogen in a mixed gas atmosphere of an inactive gas and a nitrogen-containing gas containing no hydrogen.

Upon formation of the carbon-based protection layer, the concentrations of hydrogen and nitrogen in the carbon-based protection layer can be controlled stepwise or continuously in the thickness direction thereof. Specifically, while the carbon-based protection layer is deposited in the mixed gas atmosphere of the inactive gas, the nitrogen-containing gas, and the hydrogen-containing gas, the mixing ratio of the nitrogen-containing gas and the hydrogen-containing gas are controlled.

The nitrogen-containing gas includes a nitrogen gas ($N_2$), a cyan gas ($CN_4$), a nitric acid gas ($NO_3$), a nitrous acid gas ($NO_2$), and a mixture thereof. Use may be made of an ammonia gas ($NH_3$) except the formation of the nitrogenated carbon protection layer facing the lubrication layer.

The hydrogen-containing gas includes a hydrogen gas ($H_2$), a hydrocarbon gas, such as a methane gas, an ethylene gas, and an acetylene gas, $H_2O$, and a mixture thereof.

In this invention, it is important to control the concentration of nitrogen and the concentration of hydrogen in the carbon-based protection layer. Therefore, it is important to keep cleanness of the deposition environment (sputtering atmosphere, CVD atmosphere, or ion beam deposition atmosphere). To this end, the degree of vacuum is kept at $5\times10^{-7}$ Torr or less in each of the sputtering, the CVD, and the ion beam deposition. In this event, the effect of this invention is fully exhibited.

It is possible to reform a surface layer by implanting nitrogen ions into the surface of the carbon-based protection layer formed as mentioned above.

In this invention, the method of forming the lubrication layer is not specifically restricted. Use may be made of various known methods, such as dipping, spraying, spin coating, and vapor deposition. The lubricant as a material of the lubrication layer may be in a liquid phase or in a solid phase.

BRIEF DESCRIPTION OF THE DRAWINGS

A sole FIGURE is a schematic sectional view showing a film structure of a magnetic recording medium according to an embodiment of this invention.

DESCRIPTION OF THE PREFERRED EMBODIMENT

Referring to the FIGURE, a magnetic recording medium 10 at least comprises a substrate (nonmagnetic substrate) 1, a magnetic layer 3 formed on the substrate 1, a carbon-based protection layer 4 formed on the magnetic layer 3, and a lubrication layer 5 formed on the carbon-based protection layer 4.

Among these layers, the carbon-based protection layer 4 comprises a hydrogenated carbon protection layer 4a facing the magnetic layer 3 and containing hydrogen and a nitrogenated carbon protection layer 4b facing the lubrication layer 5 and containing nitrogen and no hydrogen.

Between the substrate 1 and the magnetic layer 3, a metal layer 2 comprising a seed layer 2a and an underlayer (nonmagnetic underlayer) 2b is interposed.

The magnetic recording medium 10 having the above-mentioned structure will be described in detail in conjunction with examples and comparative examples. It is noted here that this invention is not restricted to the following examples.

EXAMPLE 1

An aluminosilicate glass was formed into a glass disk blank having a disk-like shape. The glass disk blank was successively subjected to grinding, precision polishing, and precision cleaning. In addition, the glass disk blank was chemically strengthened. As a result, the glass substrate 1 having a flat and clean surface was obtained.

By the use of an AFM (Atomic Force Microscope), the surface roughness of the glass substrate 1 was precisely measured. In order to obtain the result of measurement with high accuracy, a square area of 5 $\mu$m×5 $\mu$m was selected as a measured area. Furthermore, each side of the square area was divided into 512 meshes. For each dot, data sampling was carried out.

As a result, the surface roughness of the glass substrate was 5.04 nm in Rmax, 2.49 nm in Rp, 0.29 nm in Ra, and 0.37 nm in Rq.

The surface of the glass substrate was measured by a probe-type profilometer (Tencor P2). As a result, the surface profile of the glass substrate was not accurately measured at the resolution of the above-mentioned profilometer.

Next, by the use of a stationary sputtering machine (Circulus M12), the seed layer 2a, the underlayer 2b, the magnetic layer 3, and the carbon-based protection layer 4 were deposited on the glass substrate 1 in this order.

At first, the seed layer 2a having a thickness of 300 angstroms was deposited on the glass substrate 1 by the use of an NiAl (Ni: 50 at %, Al: 50 at %) alloy as a sputtering target.

Next, by the use of a CrMo (Cr: 80 at %, Mo: 20 at %) alloy as a sputtering target, the underlayer 2b having a thickness of 100 angstroms was deposited on the seed layer 2a.

Then, by the use of a ferromagnetic alloy consisting of 20 at % Cr, 12 at % Pt, 1 at % Ta, 5 at % B, and the balance Co as a sputtering target, the magnetic layer 3 having a thickness of 150 angstroms was deposited on the underlayer 2b.

The carbon-based protection layer 4 was formed by the hydrogenated carbon protection layer 4a and the nitrogenated carbon protection layer 4b. Specifically, the hydrogenated carbon protection layer 4a having a thickness of 55 angstroms was deposited on the magnetic layer 3 by the use of a carbon target in a mixed gas atmosphere containing a pure Ar gas and a hydrogen gas added thereto so that the content of the hydrogen gas is equal to 30%. Then, in a mixed gas atmosphere containing a pure Ar gas and a nitrogen gas, the nitrogenated carbon protection layer 4b containing no hydrogen was deposited to the thickness of 10 angstroms. Thus, the carbon-based protection layer 4 was formed.

In order that the content of nitrogen with respect to carbon was equal to 4 at % in the nitrogenated carbon protection layer 4b, use was made of a mixed gas in which the concentration of the nitrogen gas with respect to the Ar gas was equal to 8.5%. The flow rate of the mixed gas was 40 sccm.

In order to precisely control the concentration of nitrogen and the concentration of hydrogen, the nitrogenated carbon protection layer 4b was sputtered in a clean sputtering atmosphere at the vacuum degree of $4.8\times10^{-7}$ Torr.

Next, Fomblin Z-DOL manufactured by Ausimont as a lubricant was applied onto the carbon-based protection layer 4 by dipping to form the lubrication layer 5 having a thickness of 9 angstroms. Thus, the magnetic recording medium 10 in Example 1 was obtained.

The magnetic recording medium 10 thus obtained was subjected to characteristic evaluation and durability tests.

In the characteristic evaluation, the content of nitrogen with respect to carbon in the nitrogenated carbon protection layer 4b, the contents of hydrogen and nitrogen in the hydrogenated carbon protection layer 4a, the coverage by the lubrication layer 5, and the bonding ratio of the lubrication layer 5 were evaluated in the following manner.

As the durability tests, a pin-on-disk durability test, a LUL durability test, a CFT (Constant Flying Test) durability test, a corrosion test for a GMR element portion and a shield portion of a magnetic recording head, and a fly stiction test were carried out.

The results of the characteristic evaluation and the durability tests are shown in Table 1.

The content of nitrogen in the carbon-based protection layer 4 was measured by the X-ray electron spectroscopy for chemical analysis (ESCA). The content of hydrogen was measured by the hydrogen forward scattering spectrometry (HFS).

The contents of hydrogen and nitrogen in the hydrogenated carbon protection layer 4a were measured by the use of an intermediate product obtained by the use of the similar glass substrate and the similar production process and comprising the hydrogenated carbon protection layer 4a and the lower layers (i.e., without the nitrogenated carbon protection layer 4b and the lubrication layer 5).

based protection layer 4. Thereafter, the magnetic recording medium 10 was lifted at a lifting rate of 6 cm/min. Then, the thickness (t2) of the lubrication layer 5 which still remains was measured by the FTIR again. The ratio of the thickness (t2) of the lubrication layer 5 after dipping with respect to the thickness (t1) of the lubrication layer 5 before dipping was calculated as the bonding ratio of the lubrication layer 5.

Thus, the lubrication layer 5 was partly dissolved into the solvent. The lubrication layer 5 remaining after dipping was recognized as a bonded part bonded to the carbon-based protection layer 4.

The pin-on-disk test was carried out in the following manner. In order to evaluate the durability and the abrasion resistance of the carbon-based protection layer 4, an $Al_2O_3$—TiC ball having a diameter of 2 mm was pressed against the carbon-based protection layer 4 of the magnetic recording medium 10 under the load of 15 g at a radial position of 22 mm and the magnetic recording medium 10 was rotated. Thus, the $Al_2O_3$—TiC ball and the carbon-based protection layer 4 were relatively rotated at the rate of 2 m/sec in frictional contact with each other. The number of times of rotation before the carbon-based protection layer 4 was broken was measured.

The pin-on-disk test was passed if the number of times of rotation before the carbon-based protection layer 4 was broken was equal to 800 or more.

TABLE 1

| | | hydrogenated carbon protection film | | nitrogenated carbon protection film | | lubrication layer | | corrosion in GMR device & shield portion (SEM test) | fly stiction test | pin-on-disk durability test | LUL durability test | CFT durability test |
|---|---|---|---|---|---|---|---|---|---|---|---|---|
| | | content (at %) | thickness | content (at %) | thickness | coverage | bonding ratio | frequency of occurrence | pass ratio | number of times of | number of times of | number of days of |
| | | H   N | (Å) | H   N | (Å) | (%) | (%) | (%) | (%) | rotation | LUL cycles | survival |
| Examples | 1 | 15   0 | 55 | 0   4 | 10 | 88 | 70 | 0 | 100 | 1342 | reached to 800000 | reached to 30 days |
| | 2 | 15   0 | 55 | 0   5 | 10 | 90 | 72 | 0 | 100 | 1393 | reached to 800000 | reached to 30 days |
| | 3 | 15   0 | 55 | 0   7 | 10 | 94 | 75 | 0 | 100 | 1311 | reached to 800000 | reached to 30 days |
| | 4 | 15   0 | 55 | 0   8 | 10 | 94 | 74 | 0 | 92 | 872 | reached to 800000 | reached to 30 days |
| | 5 | 15   0 | 55 | 0   10 | 10 | 81 | 70 | 0 | 80 | 810 | failed at 640000 | failed at 15 days |
| | 6 | 15   0 | 55 | 0   6 | 1 | 92 | 72 | 0 | 100 | 1338 | reached to 800000 | reached to 30 days |
| | 7 | 15   0 | 55 | 0   6 | 15 | 92 | 74 | 0 | 100 | 1158 | reached to 800000 | reached to 30 days |
| Comparative Examples | 1 | 15   0 | 55 | 0   2 | 10 | 75 | 65 | 79 | 23 | — | — | — |
| | 2 | 15   0 | 55 | 0   3 | 10 | 77 | 67 | 51 | 45 | — | — | — |
| | 3 | 15   0 | 55 | 0   0 | 0 | 76 | 64 | 100 | 38 | 1426 | reached to 800000 | reached to 30 days |
| | 4 | 15   0 | 55 | 0   6 | 20 | 92 | 75 | 0 | 100 | 765 | failed at 320000 | failed at 14 days |

The thickness and the coverage of the lubrication layer 5 were measured by the X-ray electron spectroscopy described in U.S. Pat. No. 6,099,981.

The bonding ratio of the lubrication layer 5 was calculated as follows. At first, the thickness (t1) of the lubrication layer 5 was preliminarily measured by the FTIR (Fourier Transform InfraRed spectroscopy). Next, the magnetic recording medium 10 was dipped in a solvent (Vertrel XF manufactured by DuPont) for one minute to dissolve a part of the lubrication layer 5 which was not bonded to the carbon- Generally, the magnetic recording head is not brought into contact with the magnetic recording medium 10. Therefore, the pin-on-disk test is a durability test under a severe environment as compared with the actual operating environment.

The LUL test was carried out in the following manner. The magnetic recording medium 10 and a magnetic recording head having a giant magnetoresistive read element (GMR element) were mounted to a magnetic recording apparatus. The flying height of the magnetic recording head during operation at a flying position was 12 nm. The environment inside the magnetic recording apparatus was a high-temperature high-humidity severe environment at the temperature of 70° C. and the relative humidity of 80%. LUL operations were consecutively carried out 800000 times.

When the number of times of the LUL operations reached 800000 or when any failure occurs during the LUL durability test, the magnetic recording medium 10 and the magnetic recording head were taken out from the magnetic recording apparatus. By visual observation under a high-brightness halogen lamp and by observation using an optical light microscope (OLM) having a magnification of 50, the surface of the magnetic recording medium 10 and a slider portion, a GMR element portion, and a shield portion of the magnetic recording head were examined. Furthermore, the GMR element portion and the shield portion were precisely examined by a scanning electron microscope (SEM) at a magnification of 10000 in order to detect very small corrosion.

The LUL durability test was passed if the LUL operations could consecutively be carried out 600000 times or more.

In the magnetic recording apparatus generally used, it will take 10 years before the number of repetition of the LUL operations reaches 600000 times.

The CFT test was carried out as follows. The magnetic recording medium 10 and the magnetic recording head with the giant magnetoresistive read element (GMR element) were mounted to the magnetic recording apparatus. The flying height of the magnetic recording head during operation at a flying position was 12 nm. The environment inside the magnetic recording apparatus was a high-temperature low-humidity severe environment at the temperature of 70° C. and the relative humidity of 5%. The magnetic recording head was fixed to a specific radial position above the surface of the magnetic recording medium and was kept operated at a flying position for consecutive 30 days.

When the number of consecutive days reached 30 days or when any failure occurs during the CFT durability test, the magnetic recording medium and the magnetic recording head were taken out from the magnetic recording apparatus. By visual observation under the high-brightness halogen lamp and by observation using the optical light microscope (OLM) having a magnification of 50, the surface of the magnetic recording medium 10 and the slider portion, the GMR element portion, and the shield portion of the magnetic recording head were examined. Furthermore, the GMR element portion and the shield portion were precisely examined by the scanning electron microscope (SEM) at the magnification of 10000 in order to detect very small corrosion.

The CFT test was passed if the magnetic recording medium 10 survived consecutive 14 days or more. The survival after the consecutive 14 days of the CFT durability test corresponds to actual use for about 10 years in an ordinary environment of the magnetic recording apparatus.

In the magnetic recording apparatus, the magnetic head carries out a seeking operation and is not continuously kept operated at flying position at the specific radial position. Therefore, the CFT test is a durability test under a severe condition as compared with the actual use environment.

In the examples and the comparative examples, more severe test conditions were achieved by promoting the phenomenon that a small amount of deposited substances on the surface of the magnetic recording medium 10 migrate to the magnetic recording head and is condensed and deposited on the magnetic recording head. Specifically, in the LUL test and the CFT test, the magnetic recording medium was exposed to a $SO_2$ gas atmosphere to deposit sulfuric acid ions $SO_4^{2-}$ onto the surface of the magnetic recording medium before it was mounted to the magnetic recording apparatus.

In order to accelerate leakage of metallic ions (such as Co and Pt) from the magnetic layer, the magnetic recording medium was held in a high-temperature high-humidity environment before it was mounted to the magnetic recording apparatus.

Specifically, the magnetic recording medium was exposed for 12 hours to a corrosion environment in a high-temperature high-humidity atmosphere kept at a temperature of 40° C. and a relative humidity of 75% with 10 ppm $SO_2$ gas introduced therein. Thereafter, the LUL test and the CFT test were performed.

For the fly stiction test, a plurality of magnetic recording media, 100 in number, were produced. By the use of a head having a flying height of 10 nm, a full-face glide test was carried out for the 100 magnetic recording media. Upon occurrence of the fly stiction, a glide signal monitored by an AE (Acoustic Emission) sensor (piezoelectric element) mounted to the head suddenly diverges in all tracks of the magnetic recording medium. Therefore, occurrence of the fly stiction can be detected by observation using an oscilloscope. Upon occurrence of the fly stiction, the glide test pass ratio is dramatically decreased. Therefore, the tendency of occurrence of the fly stiction can be seen by the glide test pass ratio.

As the fly stiction test pass ratio (production yield) is higher, the production cost is lower. Thus, a higher pass ratio is desired but 90% or more is sufficient. If the fly stiction test pass ratio is 80%, the production cost is increased but falls within an allowable range.

EXAMPLES 2–5

In Examples 2–5, magnetic recording media were produced by the use of substrates and a production process similar to those described in conjunction with the magnetic recording medium of Example 1 except the following. Specifically, in Examples 2, 3, 4, and 5, the nitrogenated carbon protection layer 4b was formed by sputtering using a mixed gas containing the Ar gas and the nitrogen gas which had a concentration of 12.5%, 20%, 24%, and 31% so that the content of nitrogen in the nitrogenated carbon protection layer 4b was equal to 5 at %, 7 at %, 8 at %, and 10 at %, respectively. The flow rate of the mixed gas was 40 sccm. The magnetic recording media thus produced were subjected to characteristic evaluation and durability tests similar to those mentioned above. The results are shown in Table 1.

EXAMPLES 6 AND 7

In Examples 6 and 7, magnetic recording media were produced by the use of substrates and a production process similar to those described in conjunction with the magnetic recording medium of Example 1 except the following. Specifically, in both of Examples 6 and 7, the nitrogenated carbon protection layer 4b was formed by sputtering using a mixed gas containing the Ar gas and the nitrogen gas which had a concentration of 16% so that the content of nitrogen in the nitrogenated carbon protection layer was equal to 6 at %. The flow rate of the mixed gas was 40 sccm. In the magnetic recording medium of Example 6, the nitrogenated carbon protection layer 4b had a thickness of 1 angstrom. In the magnetic recording medium of Example 7, the nitrogenated carbon protection layer 4b had a thickness of 15 angstroms. The magnetic recording media thus produced were subjected to characteristic evaluation and durability tests similar to those mentioned above. The results are shown in Table 1.

Referring to Table 1, consideration will be made of the results obtained in Examples 1–7. The pin-on-disk test was passed if the magnetic recording medium survived 800 times or more. In all of Examples 1–7, the magnetic recording media passed the test.

The LUL durability test and the CFT test were passed if the magnetic recording medium survived 600,000 times or more and 14 days or more, respectively. In all of Examples 1–7, the magnetic recording media passed the tests.

As the content of nitrogen in the nitrogenated carbon protection layer 4b was increased and exceeded 7 at %, the pin-on-disk durability tends to be gradually decreased. Therefore, it is understood that the content of nitrogen on the surface of the nitrogenated carbon protection layer 4b preferably falls within a range between 4 and 7 at %.

In all of Examples 1–7, the content of hydrogen in the hydrogenated carbon protection layer 4a was equal to 15 at %. No nitrogen was detected at all.

Furthermore, measurement was made by the use of the X-ray electron spectroscopy for chemical analysis (ESCA) and the hydrogen forward scattering spectrometry (HFS). As a result, it was confirmed that, in all of Examples 1–7, the concentration of nitrogen in the nitrogenated carbon protection layer 4b is lower than the concentration of hydrogen in the hydrogenated carbon protection layer 4a as shown in Table 1. In this event, the difference in film stress between the nitrogenated carbon protection layer 4b and the hydrogenated carbon protection layer 4a was reduced. It would therefore be possible to prevent decrease in adhesive strength of the carbon-based protection layer 4 as a whole.

COMPARATIVE EXAMPLES 1 AND 2

In Comparative Examples 1 and 2, magnetic recording media were produced by the use of substrates and a production process similar to those described in conjunction with the magnetic recording medium of Example 1 except the following. Specifically, the contents of nitrogen in the nitrogenated carbon protection layer 4b were equal to 2 at % and 3 at % in Comparative Examples 1 and 2, respectively. The thickness of the nitrogenated carbon protection layer 4b was equal to 10 angstroms, like in Examples 1–5. The results of characteristic evaluation and durability tests are shown in Table 1.

COMPARATIVE EXAMPLES 3 AND 4

In Comparative Example 3, a magnetic recording medium was produced by the use of a substrate and a production process similar to those described in conjunction with the magnetic recording medium of Example 1 except that the nitrogenated carbon protection layer 4b was not formed.

In Comparative Example 4, a magnetic recording medium was produced by the use of a substrate and a production process similar to those described in conjunction with the magnetic recording medium of Example 1 except the following. Specifically, like in Example 6, the content of nitrogen in the nitrogenated carbon protection layer 4b was equal to 6 at % and the nitrogenated carbon protection layer 4b had a thickness of 20 angstroms. The results of characteristic evaluation and durability tests are shown in Table 1.

COMPARISON BETWEEN EXAMPLES 1–5 AND COMPARATIVE EXAMPLES 1, 2

In Examples 1–5, the content of nitrogen in the nitrogenated carbon protection layer 4b fell within the range between 4 at % and 10 at %. In this event, no corrosion occurred in the GMR element and the shield portion. On the other hand, in Comparative Examples 1 and 2, the content of nitrogen in the nitrogenated carbon protection layer 4b was smaller than 4 at %. In this event, corrosion occurred in the GMR element and the shield portion.

Consideration will be made of fly stiction. In Examples 1–5, the content of nitrogen in the nitrogenated carbon protection layer 4b fell within the range between 4 at % and 10 at %. In this event, the pass ratio in the fly stiction test was not lower than 80%. On the other hand, in Comparative Examples 1 and 2, the content of nitrogen in the nitrogenated carbon protection layer 4b was smaller than 4 at %. In this event, the pass ratio in the fly stiction test was decreased to less than 80%.

COMPARISON BETWEEN EXAMPLES 1–5 AND COMPARATIVE EXAMPLES 1–3

In Examples 1–5, the coverage of the lubrication layer 5 was not smaller than 80%. In this event, the occurrence of corrosion in the GMR element and the shield portion was 0%. On the other hand, in Comparative Examples 1–3, the coverage of the lubrication layer 5 was smaller than 80%. In this event, the occurrence of corrosion in the GMR element and the shield portion was increased.

Therefore, it was found out that the coverage of the lubrication layer 5 is preferably not smaller than 80% and, in this event, no corrosion occurs in the GMR element and the shield portion.

COMPARISON BETWEEN EXAMPLES 1–7 AND COMPARATIVE EXAMPLES 3 & 4

In Comparative Example 3, the thickness of the nitrogenated carbon protection layer 4b was equal to zero. In this event, corrosion and fly stiction occurred and the coverage and the bonding ratio of the lubrication layer 5 were decreased.

On the other hand, in Comparative Example 4, the thickness of the nitrogenated carbon protection layer 4b was not smaller than 20 angstroms. In this event, corrosion and fly stiction did not occur and the coverage and the bonding ratio of the lubrication layer 5 were improved. However, various durability tests, such as the pin-on-disk durability test, the LUL durability test, and the CFT durability test were not passed.

Therefore, taking the above and the results in Examples 1–5 into consideration, the thickness of the nitrogenated carbon protection layer 4b preferably falls within a range between 1 and 15 angstroms.

EXAMPLE 8

In Example 8, a magnetic recording medium was produced by the use of a substrate and a production process similar to those described conjunction with the magnetic recording medium in Example 1 except the following. Specifically, the lubricant of the lubrication layer in the magnetic recording medium of Example 1 was replaced by Z-TETRAOL manufactured by Ausimont.

The results of characteristic evaluation and durability tests of the magnetic recording medium in Example 8 is not included in Table 1. The coverage and the bonding ratio were improved to 94% and 75%, respectively. In the pin-on-disk, the LUL, and the CFT durability tests, the results were 1420 times, 800,000 times, and 30 days, respectively. From the above, the lubrication layer in the magnetic recording medium of this invention is preferably formed by the use of a Z-TETRAOL series lubricant or a lubricant containing the same.

According to this invention, migration of contaminants to the magnetic recording head can be suppressed. Therefore, in the LUL system also, corrosion and fly stiction can be suppressed. In addition, the durability is high. It is therefore possible to achieve a high production yield and a high recording density.

What is claimed is:

1. A magnetic recording medium comprising:

a substrate;

a magnetic layer formed on said substrate;

a carbon-based protection layer comprising carbon and formed on said magnetic layer; and a lubrication layer formed on said carbon-based protection layer;

said carbon-based protection layer comprising a rear boundary portion facing said magnetic layer and a front boundary portion facing said lubrication layer, said rear boundary portion comprising carbon and hydrogen, said front boundary portion including no hydrogen but comprising carbon and nitrogen;

said carbon-based protection layer comprising a hydrogenated carbon protection layer facing said magnetic layer as said rear boundary portion and a nitrogenated carbon protection layer facing said lubrication layer as said front boundary portion, said hydrogenated carbon protection layer comprising carbon and hydrogen, said nitrogenated carbon protection layer including no hydrogen but comprising carbon and nitrogen, wherein said nitrogenated carbon protection layer is formed so that the concentration of nitrogen with respect to carbon falls within a range not smaller than 4 at % and not greater than 10 at %.

2. A magnetic recording medium as claimed in claim 1, wherein said nitrogenated carbon protection layer has a thickness not smaller than 1 angstrom and not greater than 15 angstroms.

3. A magnetic recording medium as claimed in claim 1, wherein said lubrication layer has a coverage which is not smaller than 80%.

4. A magnetic recording medium as claimed in claim 1, wherein said lubrication layer has a bonding ratio which is not smaller than 70%.

5. A magnetic recording medium comprising:

a substrate;

a magnetic layer formed on said substrate;

a carbon-based protection layer comprising carbon and formed on said magnetic layer; and a lubrication layer formed on said carbon-based protection layer;

said carbon-based protection layer comprising a rear boundary portion facing said magnetic layer and a front boundary portion facing said lubrication layer, said rear boundary portion comprising carbon and hydrogen, said front boundary portion including no hydrogen but comprising carbon and nitrogen; wherein said front boundary portion is formed so that the concentration of nitrogen with respect to carbon falls within a range not smaller than 4 at % and not greater than 10 at %.

6. A magnetic recording medium as claimed in claim 5, wherein said lubrication layer has a coverage which is not smaller than 80%.

7. A magnetic recording medium as claimed in claim 5, wherein said lubrication layer has a bonding ratio which is not smaller than 70%.

8. A magnetic recording medium as claimed in claim 5, wherein said carbon-based protection layer comprises a hydrogenated carbon protection layer facing said magnetic layer as said rear boundary portion and a nitrogenated carbon protection layer facing said lubrication layer as said front boundary portion, said hydrogenated carbon protection layer comprising carbon and hydrogen, said nitrogenated carbon protection layer including no hydrogen but comprising carbon and nitrogen.

9. A magnetic recording medium as claimed in claim 8, wherein said nitrogenated carbon protection layer has a thickness not smaller than 1 angstrom and not greater than 15 angstroms.

10. A magnetic recording medium as claimed in claim 8, wherein said lubrication layer has a coverage which is not smaller than 80%.

11. A magnetic recording medium as claimed in claim 8, wherein said lubrication layer has a bonding ratio which is not smaller than 70%.

* * * * *